(12) United States Patent
Hicks

(10) Patent No.: US 8,979,287 B2
(45) Date of Patent: Mar. 17, 2015

(54) REFLECTIVE SURFACE PRODUCING A NON-REVERSED, UNDISTORTED, PERSPECTIVE VIEW

(75) Inventor: Robert Andrew Hicks, Philadelphia, PA (US)

(73) Assignee: Drexel University, Philadelphia, PA (US)

(*) Notice: Subject to any disclaimer, the term of this patent is extended or adjusted under 35 U.S.C. 154(b) by 84 days.

(21) Appl. No.: 13/377,379

(22) PCT Filed: Jun. 11, 2010

(86) PCT No.: PCT/US2010/038334
§ 371 (c)(1),
(2), (4) Date: Dec. 9, 2011

(87) PCT Pub. No.: WO2010/144816
PCT Pub. Date: Dec. 16, 2010

(65) Prior Publication Data
US 2012/0092784 A1    Apr. 19, 2012

Related U.S. Application Data

(60) Provisional application No. 61/186,165, filed on Jun. 11, 2009.

(51) Int. Cl.
*G02B 5/10* (2006.01)
(52) U.S. Cl.
CPC .................................. *G02B 5/10* (2013.01)
USPC ........................................... 359/868; 359/869
(58) Field of Classification Search
CPC .................... G02B 5/10; B60R 1/082
USPC ................................................ 359/838–884
See application file for complete search history.

(56) References Cited

U.S. PATENT DOCUMENTS

| 370,623 | A | 9/1887 | Hooker |
| 2,878,721 | A | 3/1959 | Kanolt |
| 3,836,931 | A | 9/1974 | Plummer |
| 4,116,540 | A | 9/1978 | Thomas |
| 5,625,501 | A | 4/1997 | Taggert |
| 6,412,961 | B1 | 7/2002 | Hicks |
| 8,180,606 | B2 * | 5/2012 | Hicks ............................... 703/2 |

FOREIGN PATENT DOCUMENTS

| EP | 0895098 | 2/1999 |
| JP | 2002355153 | 12/2002 |

(Continued)

OTHER PUBLICATIONS

William T. Plummer, "Unusual optics of the Polaroid SX-70 Land camera", vol. 21, No. 2 / Jan. 15, 1982.

(Continued)

*Primary Examiner* — Thomas K Pham
*Assistant Examiner* — Cara Rakowski
(74) *Attorney, Agent, or Firm* — Medelsohn, Drucker & Dunleavy, P.C.

(57) ABSTRACT

The invention relates to a reflective surface substantially perpendicular to a vector field described by the equation: W(x, y,z)=T(proj(x,v,z))−(x,v,z)+proj(x,v,z)−(x,v,z)‖T(proj(x,y, z))−(x,y,z)‖ ‖proj(x,y,z)−(x,y,z)‖ and a method for forming the reflective surface. The reflective surface is capable of providing a non-reversed, substantially undistorted direct reflection.

18 Claims, 9 Drawing Sheets

(56) References Cited

FOREIGN PATENT DOCUMENTS

| | | |
|---|---|---|
| WO | 0058129 | 10/2000 |
| WO | WO2008094886 | 8/2008 |

OTHER PUBLICATIONS

Harald Ries, et al, "Tailored freeform optical surfaces", vol. 19, No. 3 Journal of Optical Society of America.
"Magic Mirror Doesn't Reverse Images", News:lite, Mar. 3, 2009.
Mark Wilson, Gizmodo, Mathematician Creates Impossible, Rule-Bending Mirrors, Feb. 25, 2009.
Duncan Gaare, "New Mirrors Reflect Text the Right Way Round" Tech Digest, Feb. 24, 2009.
"Teaching Mirrors New Tricks", Make: Online, Jun. 10, 2009.
Robert Andrew Hicks, "Geometric Distribution for Catadioptric Sensor Design", IEEE, pp. I 584-I 587, 2001.
David E. Thomas, "Mirror Images", Scientific American, pp. 206-228, Dec. 1980.
Robert Andrew Hicks, et al, "The Method of Vector Fields for Catadioptric Sensor Design with Applications to Panoramic Imaging", IEEE Computer Society Conference on Computer Vision and Pattern Recognition, 2004.
C. Hughes, et al, Intelligent Transport System, IET, vol. 3, No. 1, Mar. 2009, Wide-angle Camera Technology for Automotive Application—A Review, p. 19-p. 31, abstract only.
Robert Andrew Hicks, "Exterior Differential Systems for Optical Design", Power Point Presentation, Oct. 7, 2007.
Robert Andrew Hicks, Article "The Mirror That Gives a True Reflection", Mar. 1, 2009.
Lucy Dodwell, "The Next Generation of Mirrors", New Scientist, Feb. 23, 2009.
"Reflecting on a New Generation of Mirrors", New Scientist, Feb. 12, 2009.
Robert Andrew Hicks, "Designing Mirrors" Nov. 23, 2009 presentation.
People Magazine, Until Physicist David Thomas for Lucky, Mirrors Had an Image Problem:: Everything was Reversed, p. 51,1981.
Tom Avril, Philadelphia Inquirer, "A Nice Reflection", p. D1-D2, Jan. 12, 2009.
Rahul Swaminathan, Shree K. Nayar and Michael D. Grossberg. "Framework for Designing Catadioptric Projection and Imaging Systems". In Proceedings IEEE Conf. on Computer Vision-PROCAMS, Nice, France 2003.
Rahul Swaminathan, Michael D. Grossberg and Shree K. Nayar. "Designing Mirrors for Catadioptric Systems that Reduce Image Errors". In Proc. European Conf. on Computer Vision-OMNIVIS, Prague, 2004.
Mandyam V. Srinivasan. A New Class of Mirrors for Wide-angle Imaging. In Proceedings of IEEE Workshop on Omnidirectional Vision and Camera Networks, Madison Wisconsin, USA, Jun. 2003.
Hicks, R. Andrew, "Designing a Mirror to Realize a Given Projection", J. Opt. Soc. Am. A, vol. 22, No. 2, Feb. 2005, pp. 323-330.
R. Andrew Hicks, Ronald K. Perline, "The Method of Vector Fields for Catadioptric Sensor Design with Applications to Panoramic Imaging," cvpr, vol. 2, pp. 143-150, 2004 IEEE Computer Society Conference on Computer Vision and Pattern Recognition (CVPR'04)—vol. 2, 2004.
R. Andrew Hicks, Ronald K. Perline, "Geometric Distributions for Catadioptric Sensor Design," cvpr, vol. 1, pp. 584, 2001 IEEE Computer Society Conference on Computer Vision and Pattern Recognition (CVPR'01)—vol. 1, 2001.
Hicks, R. Andrew, "An exact expression for the image error in a catadioptric sensor", arXiv preprint physics/0410058 posted on arXiv, Oct. 8, 2004.
Hicks, R. Andrew, "Differential Methods in Catadioptric Sensor Design with Applications to Panoramic Imaging", arXiv preprint cs.CV/0303024 posted on arXiv, Mar. 24, 2003.
Hicks, et al., "Blind-Spot Problem for Motor Vehicles", Applied Optics, vol. 44, No. 19, Jul. 1, 2005, pp. 3893-3897.
Written Opinion & ISR for PCT/US2010/038334.
C. Hughes, et al, "Wide-angle Camera Technology for Automotive Applications", p. 19, Mar. 2009.

* cited by examiner

PRIOR ART

PRIOR ART

PRIOR ART

PRIOR ART

US 8,979,287 B2

REFLECTIVE SURFACE PRODUCING A NON-REVERSED, UNDISTORTED, PERSPECTIVE VIEW

CROSS-REFERENCE TO RELATED APPLICATIONS

This application is a 35 U.S.C. §371 continuation of PCT/US2010/038334, filed Jun. 11, 2010, pursuant to, which claims benefit of priority to U.S. provisional application No. 61/186,165, filed on Jun. 11, 2009, pursuant to 35 U.S.C. §119(e), the entire disclosures of which are herein incorporated by reference in their entirety.

STATEMENT OF GOVERNMENT INTEREST

This invention was reduced to practice with Government support under Grant No. 0413012 awarded by the National Science Foundation; the Government is therefore entitled to certain rights to this invention.

BACKGROUND OF THE INVENTION

1. Field of the Invention

The invention is directed to reflective surfaces capable of providing non-reversed, substantially undistorted reflections and a method for forming said reflective surfaces. The invention may be used as a novelty item, toy, or a mirror to facilitate various activities, such as shaving. Alternatively, the invention may have a wide variety of applications in the field of optics.

2. Description of the Related Technology

It is known that by curving or creating a reflective surface with a non-linear contour, it is possible to enlarge or alter a reflection. The reflected images of these non-planar mirrors, however, are generally significantly distorted, producing non-perspective projections or poor perspective projections depending upon the curvature and shape of the mirror. By contrast, a substantially undistorted reflected image, producing a perspective projection is formed by tracing a line from an image plane I through a point COP, known as the center of projection or focal point, until it touches an object in the scene or object plane S, as shown in FIG. 1. This method of image formation can be physically realized by using a pinhole camera, where the pinhole plays the role of the center of projection. In a pinhole camera the film, or image plane I, lies behind the pinhole, but the resulting image is geometrically similar to one formed by placing a virtual image plane in front of the pinhole, as shown in FIG. 1.

Curved rectifying mirrors of the prior art that utilize this pinhole camera concept, such as the mirrors described in Hicks et al., "Reflective Surfaces as Computational Sensors," Image and Vision Computing, Volume 19, Issue 11, September 2001, pages 773-777, are capable of minimizing image distortion This mirror, however, produces a wide angle, conventional reversed image.

Hicks, et al., "Geometric distributions and catadioptric sensor design," IEEE Computer Society Conference on Computer Vision Pattern Recognition (2001), discloses a non-reversing mirror capable of producing a non-reversed and approximately rectified image of an object only when the reflective surface is tilted 45° with respect to the optical axis of the observer. Although the mirror produces a non-reversing and relatively undistorted side view reflection, it is not capable of projecting a substantially undistorted direct reflection when an observer is positioned within the field of view of the mirror.

Another mirror described in Hicks et al., "The method of vector fields for catadioptric sensor design with applications to panoramic imaging", IEEE Computer Society Conference on Computer Vision Pattern Recognition, (2004), projects a non-reversed minimally distorted reflection when the viewer is positioned at an infinite or extremely large distance from the mirror. However, the mirror is not designed to project a substantially undistorted reflection when the viewer is positioned relatively close to the mirror.

Thomas describes in "Mirror Images", Scientific American, December 1980, pp. 206-22, a non-reversing mirror made from a portion of a torus of revolution, i.e. a "toroidal" surface, more commonly referred to as a "donut" shape. The equation for a torus of revolution, having major radius a, and minor radius r, is:

$$\frac{a^4}{2} + \frac{r^4}{2} + a^2 z^2 - a^2 r^2 - y^2 r^2 - y^2 a^2 - x^2 y^2 + \frac{x^4}{2} + \\ y^2 x^2 + z^2 x^2 - x^2 a^2 + y^2 z^2 + \frac{y^4}{2} + \frac{z^4}{2} - z^2 r^2 = 0$$

Equation 1 wherein all points (x,y,z) in three dimensional space that satisfy Equation 1 will form a surface of a torus of revolution, as shown in FIG. 2, and wherein a and r constrains the mirror size and the distance from the observer to the mirror.

This mirror only projects an undistorted image when a fixed reflective plane occupying a certain position in space and reflecting an object plane positioned at a certain position in space is viewed from a pre-determined distance.

The mathematical expression for this mirror contains at most only fourth degree terms, which means that there can be substantial image distortion. In general, optical rectification requires higher order terms to produce an undistorted image. To design a non-reversing mirror having unit magnification, higher order terms are necessary to minimize distortion and/or to allow the designer to choose the optimal distance at which the mirror will be used. Thus, equation 1 does not permit a designer to create a mirror capable of projecting a non-reversing and non-distorting reflection for a pre-selected distance between the mirror and object plane to be reflected.

Another deficiency of the Thomas mirror is its inability to incorporate scaling constants in its design. Consequently, it is not possible to scale a reflection in the vertical and horizontal directions or project a substantially undistorted reflection when the mirror is viewed from different angles. The mirror, therefore, provides no means for controlling, minimizing or eliminating distortions in the vertical and horizontal directions and has been found to generate undesirable and substantial image distortions at unit magnification and at lower magnifications. Some image distortions are also produced at magnifications higher than unit magnification.

In U.S. Pat. No. 4,116,540, Thomas describes another non-reversing mirror known as a "monkey saddle." This mirror, however, does not allow for the incorporation of scaling constants and thus, produces substantial image distortion. The distortion is evident at all magnifications, but is particular prominent at unit magnification or lower magnifications. In view of the aforementioned design deficiencies, there is a need to develop a reflective surface capable of projecting a non-reversing and substantially undistorted direct reflection at various magnifications.

SUMMARY OF THE INVENTION

The invention relates to a novel curved reflective surface capable of projecting a non-reversed, substantially undistorted reflection to an observer positioned within the field of view of the mirror.

In second aspect, the invention is directed to a method and computer program for making a reflective surface capable of projecting a non-reversed, substantially undistorted reflection to an observer located within the field of view of the mirror.

DETAILED DESCRIPTION OF THE PREFERRED EMBODIMENTS

Figure 1:
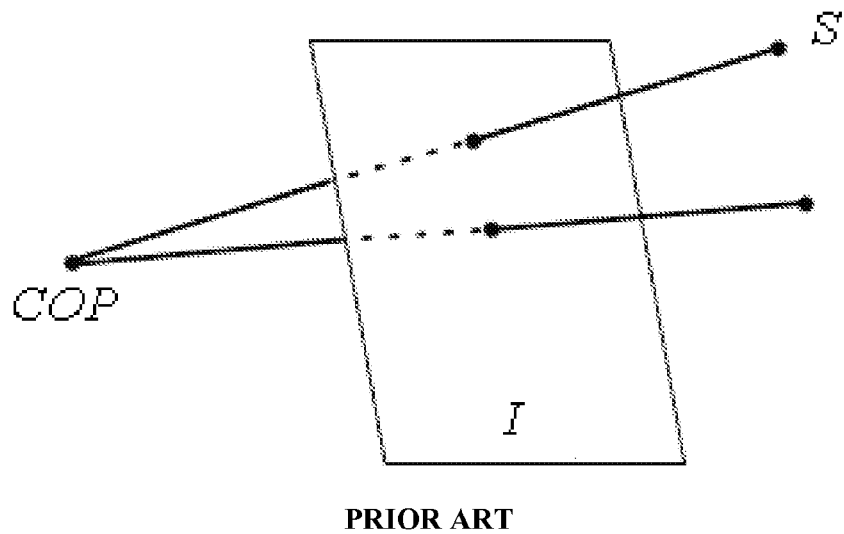
FIG. 1 is a schematic diagram illustrating the formation of perspective images.
Figure 2:
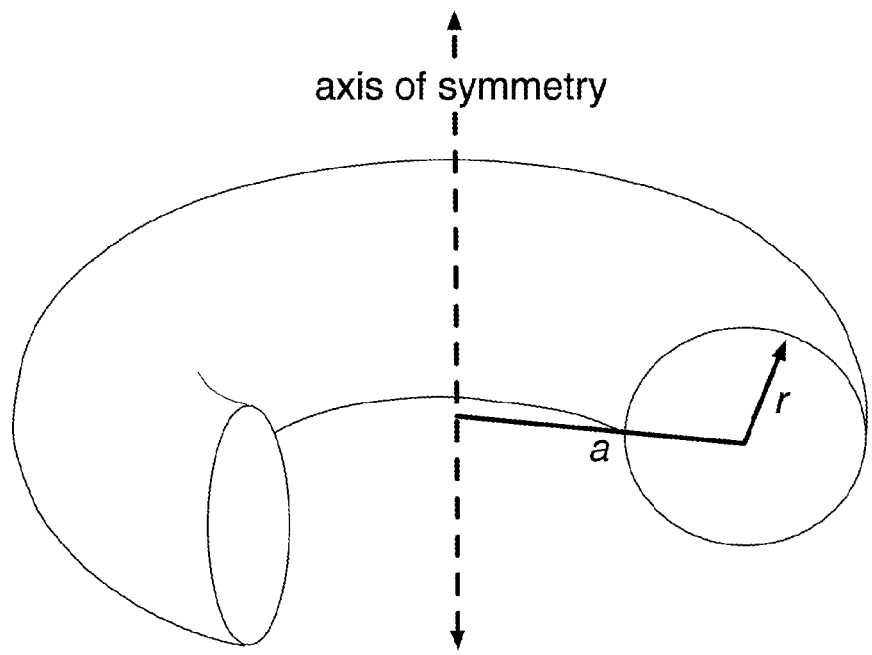
FIG. 2 is a schematic diagram of a torus of revolution, formed by revolving a circle of radius r about an axis of revolution at a distance a from the center of the circle.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. Thus, for example, reference to "a reflective surface" includes a plurality of reflective surfaces and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

For purposes of the present invention, "direct reflection" refers to the projected reflection of an object or object plane when an observer is positioned within the field of view of, and at a finite distance from the reflective surface. An observer is within the field of view of the reflective surface when the observer can see at least one of the observer's own eyes in the reflection from the reflective surface.

Additionally, as used herein, "unit magnification" refers to the projection of an image that is about the same size as projected by a perfectly flat mirror, wherein the reflected image is not magnified and does not increase the field of view of the observer.

For the purpose of this patent application, the term "substantially undistorted" is defined by an error quantity, $I_e$, of less than about 15%. Preferably $I_e$ is less than about 10%, more preferably, less than about 5% and most preferably, less than about 3%. $I_e$, which is calculated according to Equation 2. $I_e$ represents the error formed by the projection from a domain A, within an object plane S, to an image plane I via a reflective surface M. Reflective surface M induces a transform, $T_M$, from the image plane I to the object plane S by tracing light rays backwards from the image plane I, off of the reflective surface M and to the object or object plane S.

$$I_e = \frac{1}{\text{diameter}(T(A))}\left(\int_A \|T(1, y, z) - T_M(1, y, z)\|^2 \, dy dz\right)^{\frac{1}{2}} \quad \text{Equation 2}$$

In one aspect, the present invention is directed to a system including an observer O, a reflective surface M capable of projecting a non-reversed, substantially undistorted reflection and one or more objects or an object plane S to be reflected to the observer O. The reflective surface M may be designed to project a non-reversed, substantially undistorted direct reflection of an objector object plane S. The reflective surface M may also be capable of producing a non-reversing and substantially undistorted reflection at varying degrees of magnification, thereby producing narrow or wide angle fields of view.

Figure 3:
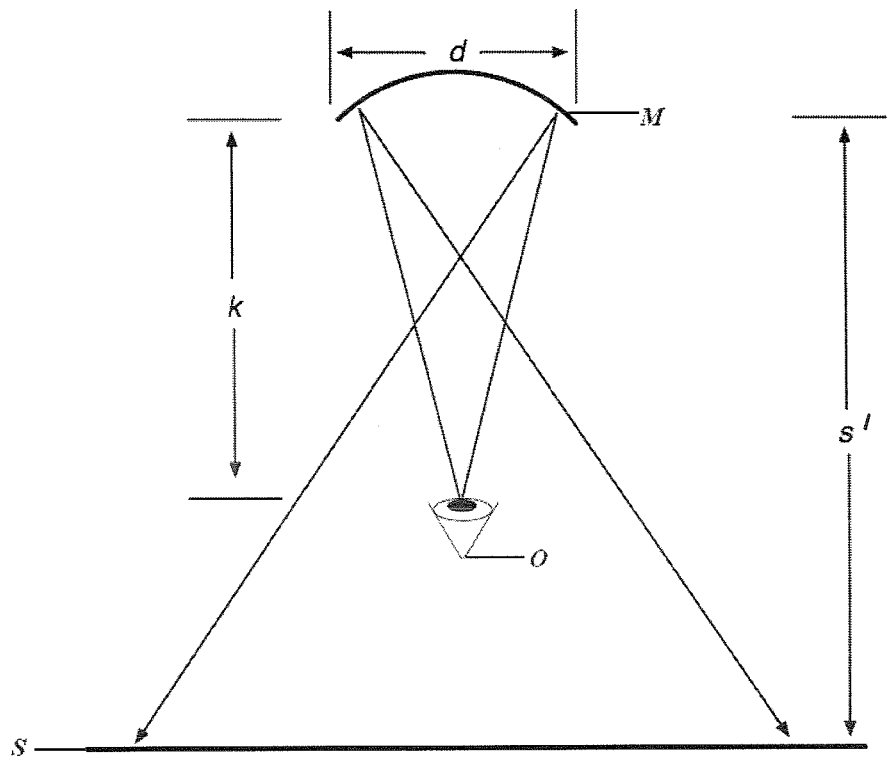
FIG. 3 is a schematic diagram of the system of the present invention illustrating the relative positions of an observer, a reflective surface and reflected object plane.

The system of the present invention may be defined in accordance with a set of parameters describing the relative position of reflective surface M, the object or object plane S to be reflected and the observer O. In an exemplary embodiment, four parameters may be used to describe the system of the present invention: the width or diameter of the reflective surface, d, the distance between the observer O and the reflective surface, k, the distance s', from the reflective surface M to the object or object plane S to be reflected, and a scale factor, α, that determines the extent of the object plane S viewable by the observer O. FIG. 3 is a schematic diagram of the system showing the aforementioned parameters and relative position of the reflective surface M. These system parameters may be used to provide a reflective surface M that is capable of producing a non-reversed and substantially undistorted image.

In another embodiment, reflective surface M may be scaled using different scaling factors in the vertical and horizontal directions. Rather than just using one scaling factor α, a second scaling factor, β, may be introduced for a total of five system parameters. In addition to these five parameters, an arbitrary number of basis functions may be selected to influence the shape of the reflective surface M.

For purposes of the present application, a non-reversing and substantially undistorted reflective surface M may be designed wherein the width or diameter of the reflective surface, d, may be selected as any positive number and may vary depending upon the desired application.

Similarly, k may be selected to be any positive number representing the distance between an observer O and the reflective surface M and may vary depending upon the application. In an exemplary embodiment, k may be greater than about one tenth the numerical value of d. In an alternative embodiment, k may represent a distance of about 60 cm or less or about 35 cm or less, so that the reflective surface M may project a non-reversed and substantially undistorted direct reflection when held at about arm's length from the observer O.

The distance s' from reflective surface M to object or object plane S may be selected as any positive number and may vary depending upon the desired application. In an exemplary embodiment, distance s' may be greater than about one tenth the numerical value of d. In an alternative embodiment, distance s' may be about equal to the value of k.

Figure 4:
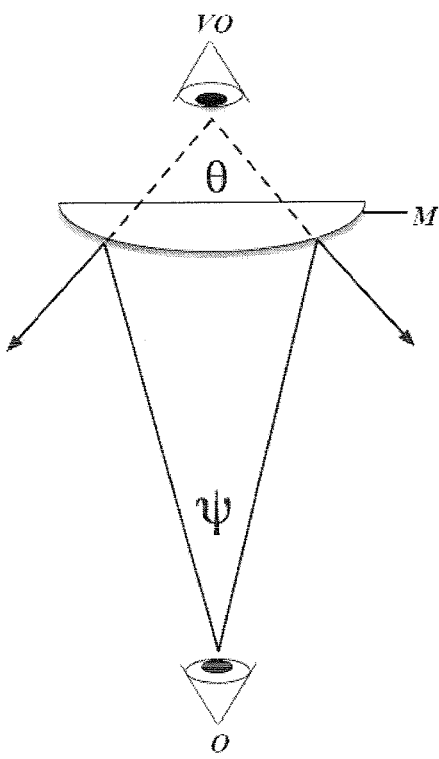
FIG. 4 is a schematic diagram illustrating a magnified reflection of an exemplary curved reflective surface of the present invention.

Scaling constants α and β may be any magnification factor. In an exemplary embodiment, α and/or β may be selected so that the reflective surface M may project an image having about unit magnification, wherein α is about k+s' and/or β is about k+s'. Alternatively, scaling constants α and/or β may be selected to produce a reflection having a magnification greater than unit magnification, wherein a is greater than about k+s' and/or β is greater than about k+s'. At this magnification, reflective surface M, projects a field of view greater than the angle subtended from the observer's eye to the reflected surface, as shown in FIG. 4. Observer O has an apparent field of view of angle ψ, but due to the curvature of the reflective surface, observes what a virtual observer VO having a greater field of view, θ, would see from the other side of the reflective surface M. In an exemplary embodiment, α and β are scalar products that are sufficiently large so as to create a wide angle field of view of at least about 30°, preferably at least about 40° and more preferably at least about 45° when an observer O is positioned within the field of view of the reflective surface M, as shown in FIG. 4.

The scaling constants may also be selected to project a reflection less than unit magnification, wherein α is less than about k+s' and/or β is less than about k+s'. Depending on the selection of scaling constant α and/or β, reflective surface M may project a reflection having a narrow or wide angle field of view.

Figure 5:
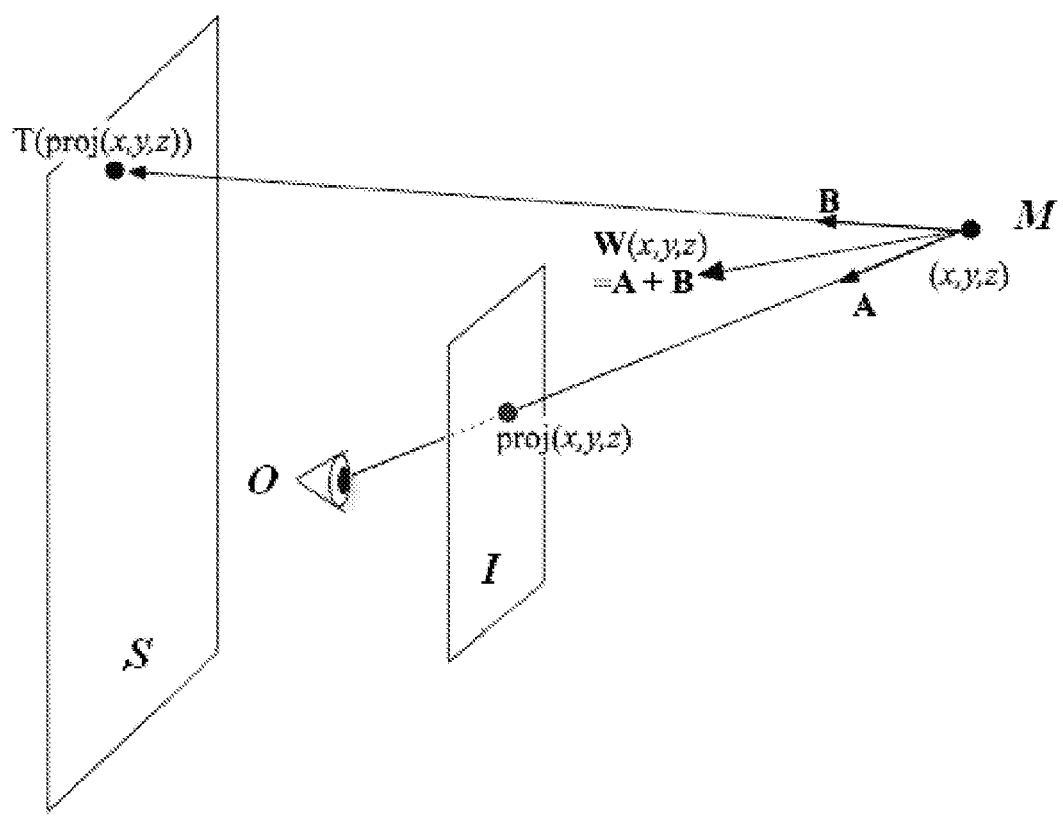
FIG. 5 is a schematic diagram illustrating the derivation of the equation for the vector field W(x,y,z), given a transformation T applied from the image plane I to the object plane S.

To obtain a non-reversed, substantially undistorted direct reflection of an object or object plane S, a transform function, T, must first be computed. As illustrated in FIG. 5, T maps an image plane I to an object plane S in a prescribed way, that is: T:I→S. T(A) is the image of a domain A, which varies depending on the application, in the image plane I over which a reflective surface M is a graph. $T_M$ is the non-reversed image transformation induced from the image plane I to the object plane S by a reflective surface M. Equation 2 provides a means of comparing the actions of T and $T_M$ and may be interpreted as an average, computed by considering the distance between an image of a point in the image plane I under the given transform T and the transform $T_M$ induced by the reflective surface M.

The novel reflective surface M of the present invention may be expressed as x=g(y,z), or g(x,y,z)=C. Each of these expressions determines collection of points (x,y,z) in space that produces a non-reversed, substantially undistorted reflection such that, when viewed along the positive x axis, the induced projection maps a point, proj(x,y,z) in the image plane I, to a point $T_M$ (proj(x,y,z)) on an object plane S. The transform function T induced by the reflective surface, $T_M$, maps the image plane I to an object plane S such that resulting image viewed by an observer O is a non-reversed image. Note that this is the opposite of the direction that real light travels, but is framed this way for mathematical simplicity. There is no theoretical problem posed by this approach due to the fact that in the geometric optics model, the systems are all reversible in the sense that the light rays traveling through them will behave the same if they are reversed.

To illustrate the computation of a non-reversing transform, T, assume that the observer's eye is located at the origin (0,0,0) in 3-dimensional space, an object plane S is located at ($x_0$,0,0) where $x_0$=−(s−k) and an image plane I is located at x=1, i.e. points of the form (1,u,v). Then every point in the image plane I may be transformed to a point in the object plane S by the transformation.

T(1,u,v)=($x_0$,−αu,βv), where α and β are a scaling constants that may be selected by a designer. Scaling constants α and β enables the image to be selectively scaled according to different values in the vertical and horizontal directions. These scaling constants may be useful for situations in which the reflective surface M is to be viewed at an angle by the observer O; by applying the appropriate choice of α and β, it may be possible to remove image distortions caused by the observer's position relative to reflective surface M. This technique is sometimes referred to as anamorphosis, and is a familiar method used for writing signs on the ground for traffic safety. For example, the word "STOP" is often written on the ground at an intersection in an elongated manner so as to appear with normal proportions to the driver. In an exemplary embodiment, α and β may be substantially equal and sufficiently large so that transform function T creates a substantially undistorted magnification of the image plane I onto the object plane S, thereby creating a non-reversed reflection.

Based on the aforementioned correspondence between the image plane I and object plane S, a vector field W(x,y,z) is then defined on some subset of three dimensional space, as shown in FIG. 5.

To compute the vector field W(x,y,z), a point (x,y,z) is projected along a ray to a point denoted as proj(x,y,z), located in the image plane I, as is depicted in FIG. 5. The non-reversing correspondence function T may then be used to compute the desired point T(proj(x,y,z)) in the object plane S. Then unit vectors, A, from the point (x,y,z) to proj(x,y,z), and B, from (x,y,z) to T(proj(x,y,z)), may then be computed and added together to define the vector W(x,y,z). This procedure defines a non-zero vector field W(x,y,z) on a subset of three-dimensional space.

Once vector field W(x,y,z) has been computed, points on reflective surface M can be found by minimizing the Cost($f$) as defined in Equation 3 over a space of possible input functions, $f$. Equation 3 may be employed to calculate numbers representative of points on the reflective surface M based on input functions $f$.

$$\text{Cost}(f) = \int\int\int_V \|\nabla f \times (W/\|W\|)\|^2 dx\,dy\,dz \quad \text{Equation 3}$$

The reason for this is that, in general, if one considers a family of surfaces $g(x,y,z)=C$, then the gradient of $g$, $\nabla g$, is a vector field perpendicular to these surfaces, and thus if one can find a $g$ such that $\nabla g$ is close in direction to $W$, then the surface will have the required optical properties. If $\nabla g$ is close in direction to $W$ then $\|\nabla g \times W\|^2$ will be small if $W$ is constrained to have a length one at each point. Thus if this quantity is integrated over the volume $V$, a good measure of how well the $g(x,y,z)=C$ will serve as a solution surface is obtained. The minimization is performed over a function space of admissible $f$, whose gradient is bounded away from 0, and the resulting minimizer, $f^*$, will represent the reflective surface M in the sense that the reflective surface M will the solution set to Equation 4.

$$f^*(x,y,z)=C. \quad \text{Equation 4}$$

Here C is a constant that is chosen so that the solutions lie in the volume V. If the solution surface is to pass through the point (a,b,c) in V, then $C=f^*(a,b,c)$. The minimization may be done in any number of well-known ways, such as by the Rayleigh-Ritz method as described in Ward Cheney, "Analysis for Applied Mathematicians," Springer-Verlag New York Inc., 2001, herein incorporated by reference for the description of the Rayleigh-Ritz method.

As indicated in Equation 3, $\nabla f$ is a gradient vector field and V is a volume in three-dimensional space where the reflective surface M lies. A conventional software program may be created to implement a minimization technique, such as the Rayleigh-Ritz method, in order to calculate the minimizer $f^*$ of Equation 4 that represents a reflective surface M. Equation 3 is minimized over a space of functions $f$, described in Equation 5, wherein the gradient of all functions in that space is bounded away from zero, to produce the minimizer $f^*$ representing the surface M. For example, one may choose, but is not exclusively bound to, the space of possible $f$ to be polynomials of the form:

$$f(x, y, z) = \sum_{i+j+k \leq N} a(i, j, k) x^i y^j z^k \quad \text{Equation 5}$$

where N is a fixed positive integer, and $\alpha_{1,0,0}=1$. Notice that with this type of function the gradient is bounded away from zero because the coefficient of the x term is one. Here the polynomial terms, $x^i y^j z^k$ are the basis functions and the $\alpha_{i,j,k}$ are the unknown coefficients that will be solved for. One may in general choose any basis functions, such as trigonometric functions or wavelets and express:

$$f(x, y, z) = \sum_{i+j+k \leq N} a(i, j, k) \phi_{i,j,k}, \quad \text{Equation 6}$$

and all the described methods will still hold. In general, the more basis functions used, the more accurate the resulting design will be. Thus, increasing N corresponds to a more refined result.

The resulting surface M, corresponding to the minimizer $f^*$ will produce a non-reversed, substantially undistorted direct reflection. In order to minimize the expression in Equation 3, the vector field W must be computed. W is specific to the problem in the sense that it depends on the parameters k, s', d as depicted in FIG. 3, and scale factors $\alpha$ and/or $\beta$, which will determine how much of the object plane S is seen by the observer O in the reflective surface M.

To implement this method for determining the reflective surface M, the coordinates of a vector W at a point (x,y,z) are determined by first calculating a source point, proj(x,y,z) in the image plane I, which is the projection of the point (x,y,z) along a line connecting (x,y,z) and the focal point. For example, if the focal point (observer's eye) is at the point (0,0,0) and the image plane I is the plane x=1, then the point (x,y,z) would project to proj(x,y,z) where:

$$\text{proj}(x,y,z)=(1,y/x,z/x). \quad \text{Equation 7}$$

Hence, proj(x,y,z) is defined as the point in the image plane I intersected by the ray containing (x,y,z) and the coordinates corresponding to the eye of an observer, as shown in FIG. 5. By appropriately selecting the coordinates and units, the projection of the point (x,y,z) to the image plane I may always be expressed by Equation 7. The corresponding point on the object plane S is T(proj(x,y,z)), which may be expressed as shown in Equation 8:

$$T(\text{proj}(x,y,z))=(x_0-\alpha y/x, \beta z/x) \quad \text{Equation 8}$$

where $\alpha$ and $\beta$ are the scaling factors. Using these coordinates, the image plane I is the plane x=1 and the object plane S is the plane $x=x_0$.

Once T is defined, vector field W may be defined according to Equation 9.

$$W(x, y, z) = \frac{T(\text{proj}(x, y, z)) - (x, y, z)}{\|T(\text{proj}(x, y, z)) - (x, y, z)\|} + \frac{\text{proj}(x, y, z) - (x, y, z)}{\|\text{proj}(x, y, z) - (x, y, z)\|} \quad \text{Equation 9}$$

To determine reflective surface M based on the above calculated vector field W the integral in Equation 3 must be minimized as described above. The result is Equation 4, whose solutions lying in the volume V represent the reflective surface M, and which may be computed using any suitable conventional software program.

Figure 6:
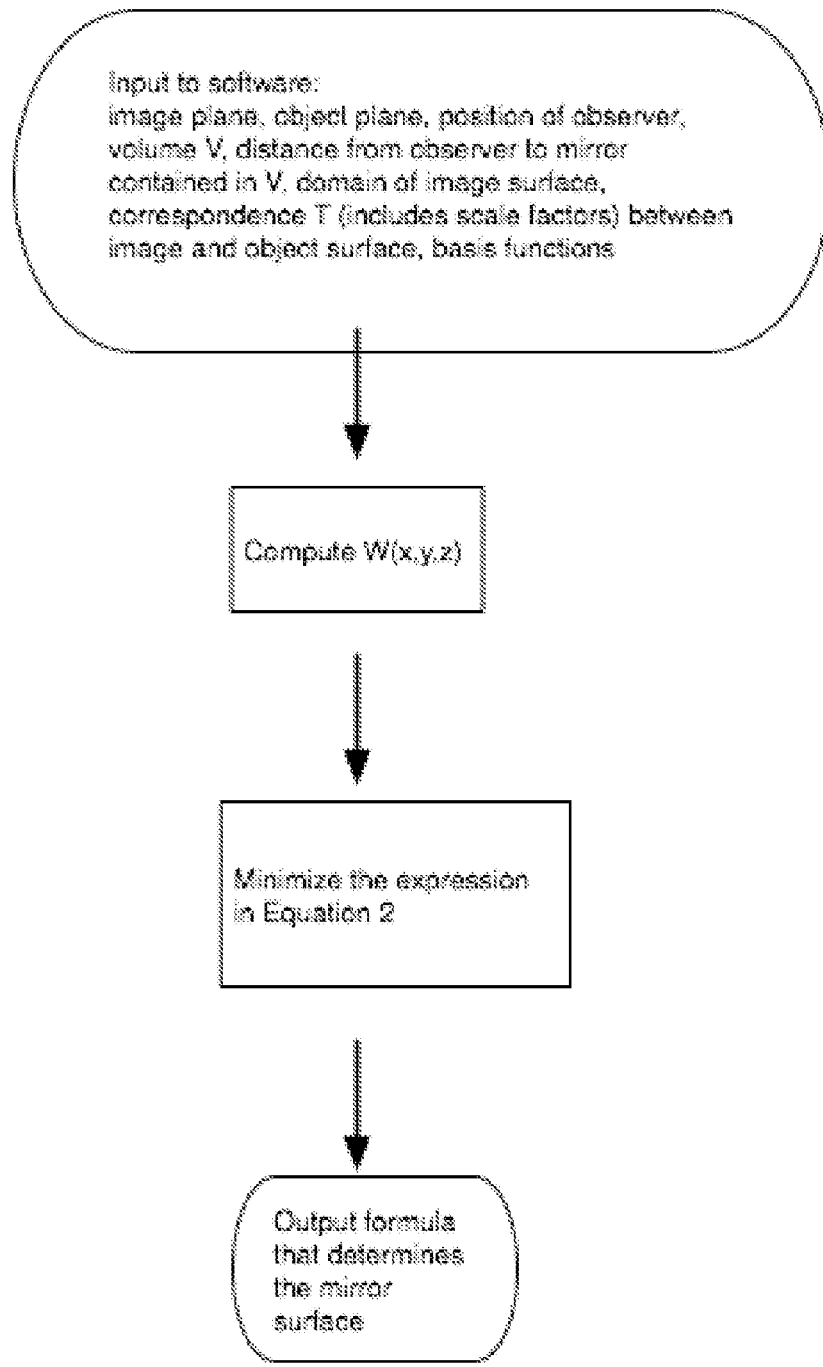
FIG. 6 is a flowchart of an exemplary method for generating a reflective surface in accordance with the present invention.

The method of the present invention, as shown in FIG. 6, may be implemented by a computer program and the instructions for carrying out the method may be recorded on a computer readable medium. The method may be executed using any suitable computational device or software program capable of generating the reflective surface M of the present invention. Upon inputting parameters representing the image plane I, source points, object plane S, the correspondence between the image and object plane S, and the observation point, the method computes the expression W(x,y,z). The minimization is then performed using a set of basis functions to find $f^*$.

In an exemplary embodiment, the resultant reflective surface M may have a curvilinear surface, such as a saddle-like shape, a concave shape, a convex shape or a combination thereof. In an exemplary embodiment, the reflective surface M is not toroidal and/or need not have a combination of a concave and convex surface. The reflective surface M may be capable of providing a non-reversing and substantially undistorted direct reflection over a wide range of magnifications, producing wide or narrow angle reflections.

The reflective surface M of the present invention has numerous applications in the field of non-imaging optics. In an exemplary embodiment, the invention may be a novelty item or a toy. Alternatively, the reflective surface M may be used to facilitate activities such as shaving or personal grooming by providing the user with a substantially undistorted non-reversed reflection of the user.

EXAMPLES

Example 1

Figure 7:
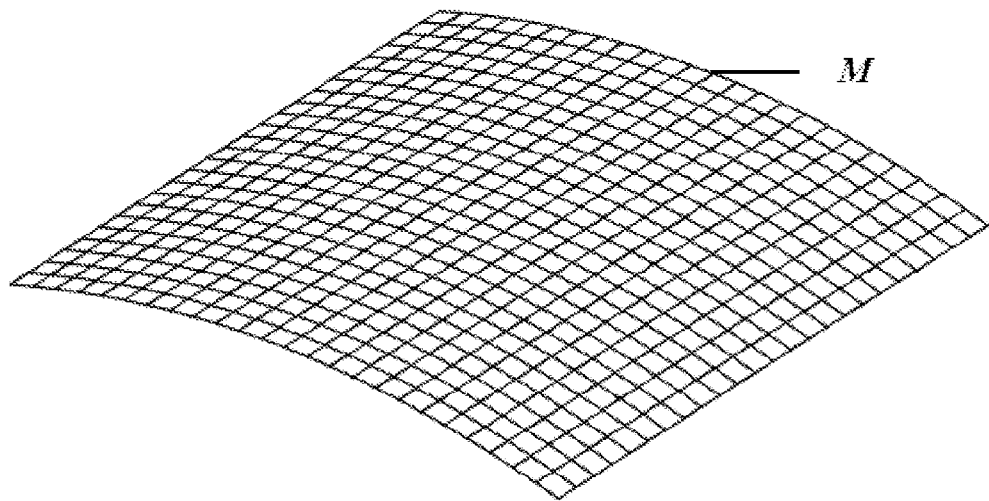
FIG. 7 is one embodiment of the reflective surface M of the present invention capable of providing a non-reversed image at unit magnification.

An exemplary convex reflective surface M of the present invention is illustrated in FIG. 7. The units provided in this example are given in cm. Reflective surface M was designed to project a non-reversing and substantially undistorted image in the system of FIG. 4(c), wherein d was about 10 cm. k was about 35 cm, s' was about 35 cm, $\alpha$ was about 70, and $\beta$ was about 70. Since k=s', reflective surface M is designed to project an optimal direct reflection. Equation 10 is obtained by applying these parameters to Equation 8

$$W(x,y,z)=(1,-70y/x,70z/x) \qquad \text{Equation 10}$$

In this example, $$f(x,y,z)=x+\alpha_{002}z^2+\alpha_{020}y^2+\alpha_{004}z^4-\alpha_{022}y^2z^2-\alpha_{040}y^4+\alpha_{006}z^6+\alpha_{024}y^2z^4+\alpha_{042}y^4z^2+\alpha_{006}y^6+\alpha_{122}xy^2z^2, \qquad \text{Equation 11}$$

where the $\alpha_{ijk}$ were solved for using the method of the present invention. Optionally, $f(x,y,z)$ may include more polynomial terms and/or other non-polynomial terms, such as trigonometric functions. In this example, only even powers of y and z were necessary because the solution for the reflective surface M was designed to be symmetric about the y and z axes. The result of the minimization is expressed below in Equation 12.

$$f^*(x,y,z)=0.4648536346e-4^*z^2-0.2906308187e-1^*y^2+0.4105209785e-5^*z^4-0.8239039233e-3^*y^2{}^*z^2+0.9805032821e-5^*y^4+5.819503046^*10^{\wedge}(-14)^*z^6-4.113285799^*10^{\wedge}(-7)^*y^2{}^*z^4+7.210352914^*10^{\wedge}(-7)^*y^4{}^*z^2-3.429886605^*10^{\wedge}(-8)^*y^6+0.2306643835e-4^*x^*y^2{}^*z^2+35.0=0 \qquad \text{Equation 12}$$

x was solved for as a function of y and z, and the reflective surface M was the graph of the resulting function of y and z, where y varies from −5 cm to 5 cm and z varies from −5 cm to 5 cm.

Figure 8:
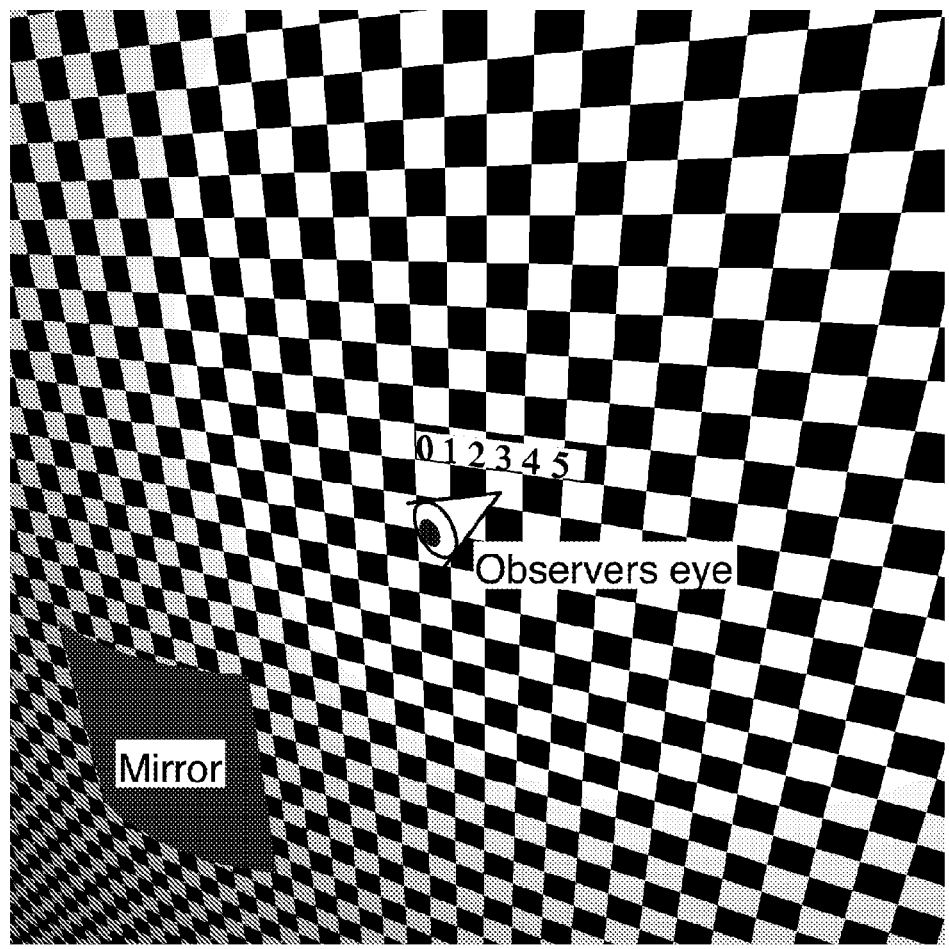
FIG. 8 is a checkerboard patterned test scene with sample text printed thereon that was used in evaluating the quality of the reflections provided by various reflective surfaces.
Figure 9:
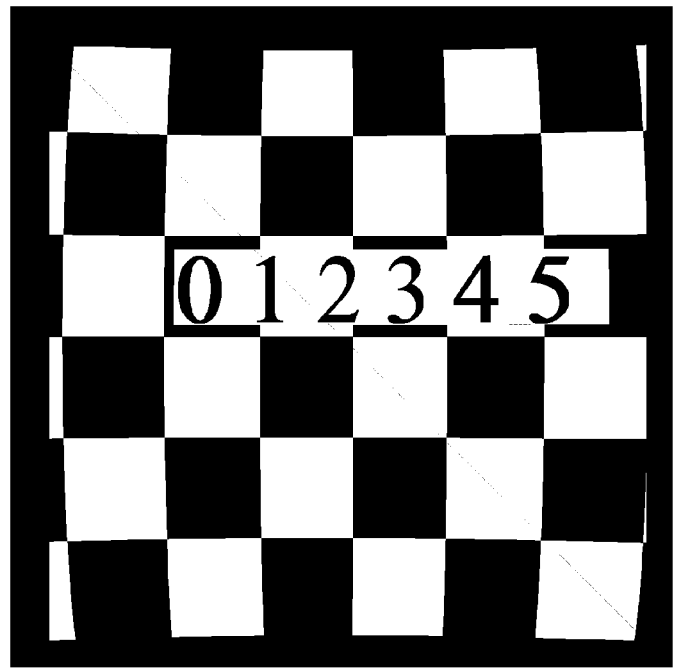
FIG. 9 is a simulated reflection of the scene in FIG. 8 using the reflective surface of FIG. 7.

A test scene having a checkerboard pattern with a white box including the text "0 1 2 3 4 5" is shown in FIG. 8. In this test scene, the observer's eye is placed at the origin, (0,0,0). Using a computer software system, a simulated reflected image of this scene using exemplary reflective surface M viewed from (0,0,0) was generated, as shown in FIG. 9. Notably, the reflected image is non-reversed and substantially undistorted at unit magnification.

Comparative Example A

Figure 10:
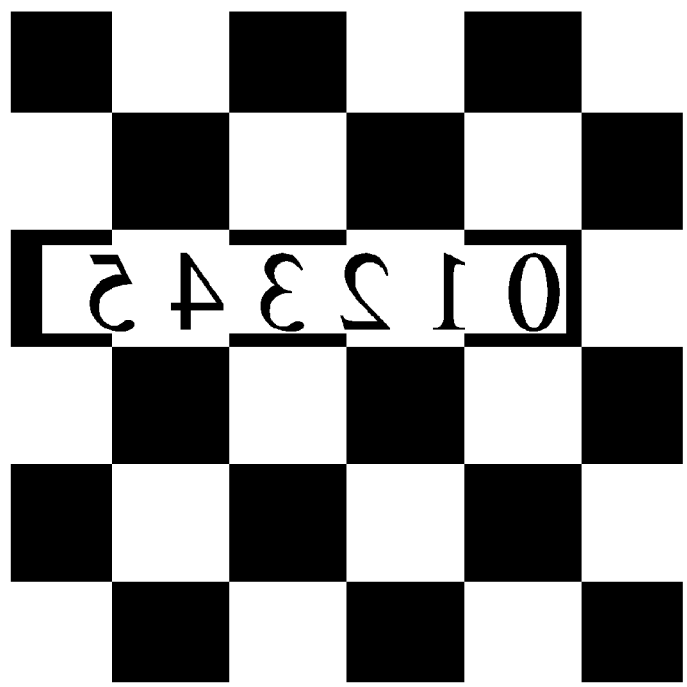
FIG. 10 is a simulated reflection of the scene in FIG. 8 using a conventional flat mirror having the same size as the reflective surface of FIG. 7.

FIG. 10 depicts a simulated view of the same checkerboard pattern of FIG. 8 using a conventional flat mirror having the same dimensions as the reflective surface of Example 1, wherein d is about 10 cm. The simulated reflection was generated using the same parameters and system conditions as in Example 1, wherein s' was about 35 cm and k was about 35 cm. In comparison to the reflection generated by exemplary reflective surface M, FIG. 10 shows a reversed image of the checkerboard scene.

Comparative Example B

Figure 11:
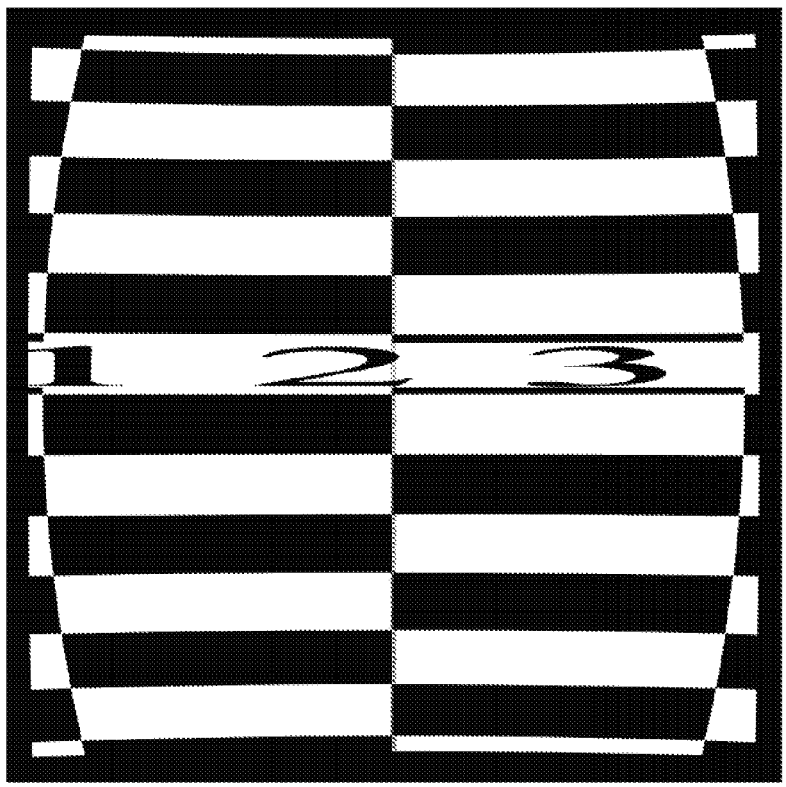
FIG. 11 is a simulated reflection of the scene in FIG. 8 using a toroidal mirror having approximately the same size as the reflective surface of FIG. 7.

FIG. 11 depicts a simulated view of the same checkerboard scene of FIG. 8 using a torus shaped mirror such as that described in "Mirror Images", Scientific American, December 1980, wherein d is about 10 cm. The simulated reflection was generated using the same parameters and system conditions in Example 1, wherein s' was about 35 cm and k was about 35 cm. As shown in FIG. 11, the torus-shaped mirror produces a substantially distorted reflection of the checkerboard scene at unit magnification.

Comparative Example C

Figure 12:
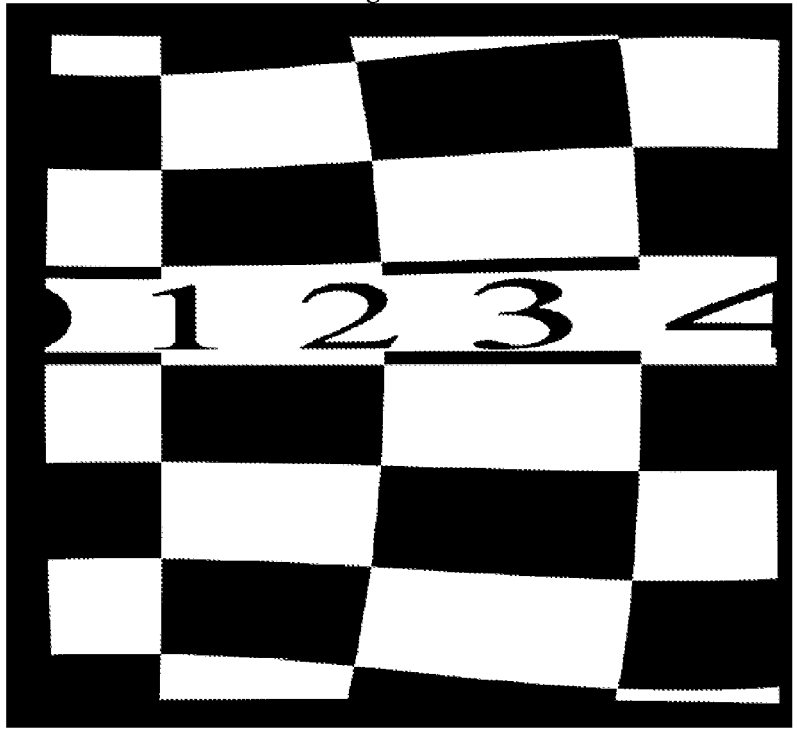
FIG. 12 is a simulated reflection of the scene in FIG. 8 using a passenger side view mirror for a vehicle having approximately the same size as the reflective surface of FIG. 7.

FIG. 12 depicts a simulated direct reflection of the same checkerboard scene of FIG. 8 using a passenger side view mirror such as is described in Hicks, et al., "Geometric distributions and catadioptric sensor design," IEEE Computer Society Conference on Computer Vision Pattern Recognition Computer Vision Pattern Recognition (2001), wherein d was about 10 cm. The simulated reflection was generated using the same parameters and system conditions as in Example 1, wherein s' was about 35 cm and k was about 35 cm. As shown in FIG. 12, the passenger side mirror generated a substantially distorted reflection of the checkerboard scene at unit magnification.

Comparative Example D

Figure 13:
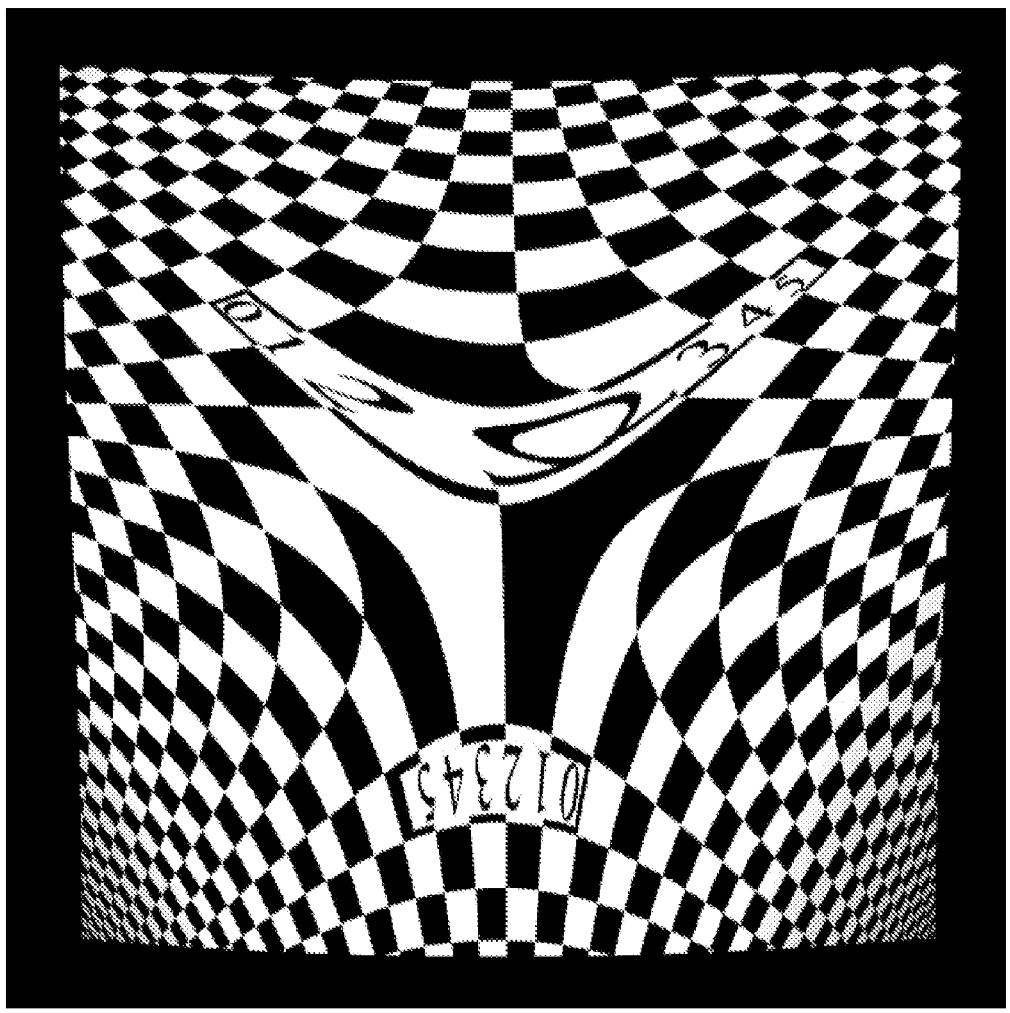
FIG. 13 is a simulated reflection of the scene in FIG. 8 using a monkey saddle mirror having approximately the same size as the reflective surface of FIG. 7.

FIG. 13 depicts a simulated view of the same checkerboard scene of FIG. 8 using a monkey saddle-shaped mirror such as is described in U.S. Pat. No. 4,116,540, wherein d was about 10 cm. The simulated reflection was generated using the same parameters and system conditions as in Example 1, wherein s' was about 35 cm and k was about 35 cm. As shown in FIG. 13, the mirror produces a substantially distorted reflection of the checkerboard scene at unit magnification.

Example 2

Figure 14:
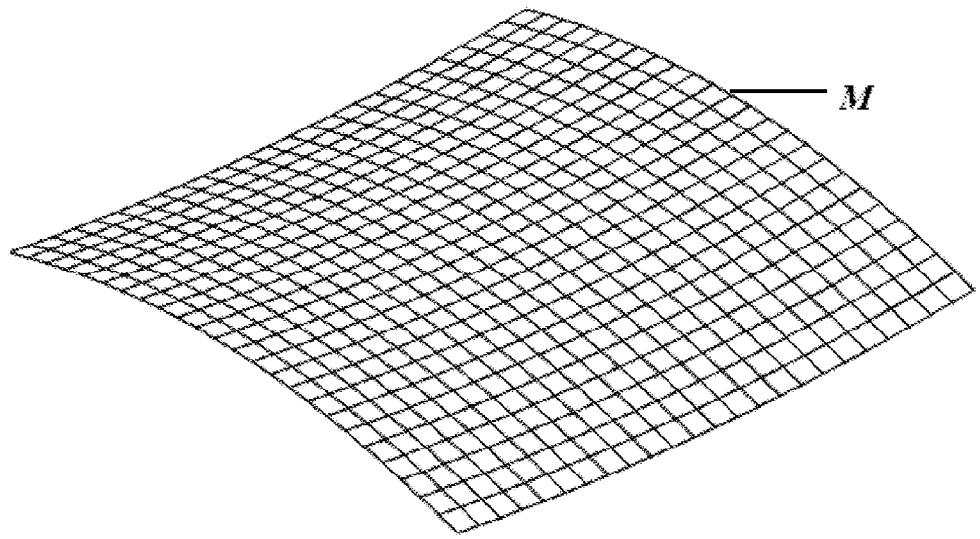
FIG. 14 shows a second embodiment of the reflective surface M of the present invention having a saddle like surface that produces a magnified, wide angle, non-reversed reflection.

An exemplary saddle-shaped reflective surface M of the present invention having a wide angle field of view is illustrated in FIG. 14. The units provided in this example are given in cm. Reflective surface M was designed to project a non-reversing and substantially undistorted image in the system of FIG. 4(c), wherein d was about 6.32 cm, k was about 35 cm and s' was about 35 cm. The scale constants $\alpha$, $\beta$ were selected to rectify a reflective surface M having the aforementioned parameters and a dimension of about 6.32 cm in the y-direction and about 6.32 cm the z-direction. The resultant reflective surface M was slightly smaller than in Example 1, but by setting $\alpha$ to about 150 and $\beta$ to about 150, reflective surface M reflected a larger portion of the checkerboard test scene shown in FIG. 8. Based on these parameters, $$W(x,y,z)=(1,-150y/x,150z/x). \qquad \text{Equation 13}$$

In this example, $$f(x,y,z)=x+\alpha_{002}z^2+\alpha_{020}y^2+\alpha_{004}z^4-\alpha_{022}y^2z^2-\alpha_{040}y^4+\alpha_{006}z^6+\alpha_{024}y^2z^4+\alpha_{042}y^4z^2+\alpha_{006}y^6+\alpha_{122}xy^2z^2, \qquad \text{Equation 14}$$

After minimization, $$f(x,y,z)=x-0.1799120e-1^*z^2+0.4802762e-1^*y^2+0.4498532e-5^*z^4-0.1701749e-2^*y^2{}^*z^2-0.8092309e-4^*y^4+4.038809^*10^{\wedge}(-8)^*z^6+0.6936659e-5^*y^2{}^*z^4-0.6477527e-5^*y^4{}^*z^2+0.1045171e-5^*y^6+0.5201649e-4^*x^*y^2{}^*z^2-33.85=0 \qquad \text{Equation 15}$$

x was solved for as a function of y and z, and reflective surface M is the graph of the resulting function of y and z, where y varies from about −3.16 cm to about 3.16 cm and z varies from about −3.16 cm to about 3.16 cm. A graph of reflective surface M is shown in FIG. 14.

Figure 15:
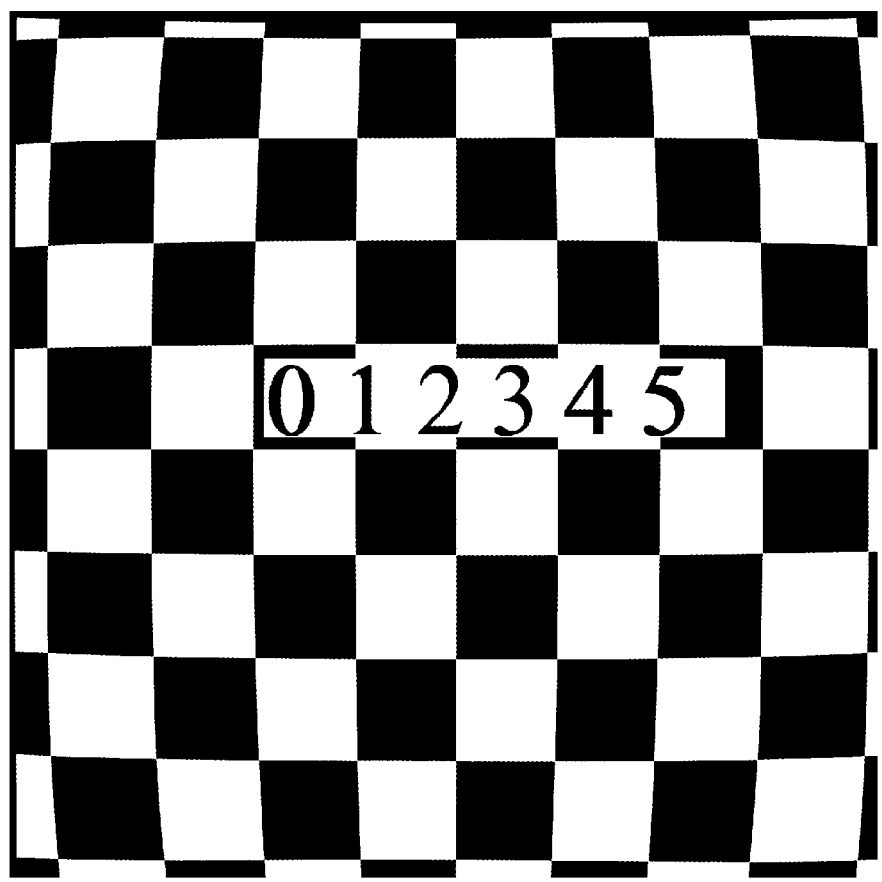
FIG. 15 is a simulated reflection of the scene in FIG. 8 using the reflective surface of FIG. 14.

The checkerboard patterned test scene of FIG. 8 was used to evaluate the functionality of reflective surface M. Using a computer software system, a simulated reflected image of this scene using exemplary reflective surface M viewed from (0,0, 0) was generated, as shown in FIG. 15. FIG. 15 shows a non-reversed, substantially undistorted image having a magnification larger than unit magnification. Reflective surface M projected a 45° degree field of view of the checkerboard when the observation point was set to be at the position of the mirror.

Having described the preferred embodiments of the invention, which are intended to be illustrative and not limiting, it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, the intended scope of protection is set forth in the appended claims.

The invention claimed is:

1. A non-reversing mirror comprising: a reflective surface M perpendicular to a vector field W of the following equations:

$$\text{proj}(x,y,z) = (1, y/x, z/x)$$

$$T(\text{proj}(x,y,z)) = (x_0, -\alpha y/x, \beta z/x)$$

wherein k is the distance between the reflective surface and observer, s' is the distance from the reflective surface M to the object plane, $x_0 = -(s'-k)$, and $\alpha$ and $\beta$ are magnification factors, $$W(x, y, z) = \frac{T(\text{proj}(x, y, z)) - (x, y, z)}{\|T(\text{proj}(x, y, z)) - (x, y, z)\|} + \frac{\text{proj}(x, y, z) - (x, y, z)}{\|\text{proj}(x, y, z) - (x, y, z)\|}$$

wherein T is a transformation from an image plane to an object plane of a non-reversed, undistorted direct reflection of an object or object plane, wherein the reflective surface M is represented by a minimizer $f^*$ represented by the polynomial function $f(x,y,z)$:

$$f(x, y, z) = \sum_{i+j+k \leq N} a(i, j, k) x^i y^j z^k$$

where N is a fixed positive integer, there are at least three variable coefficients $\alpha(i,j,k)$ and $a(1,0,0) = 1$;
  wherein the reflective surface M produces a non-reversed perspective view reflection at the image plane when viewed from a perspective of an observer positioned within the field of view of said reflective surface M;
  wherein the reflective surface M has an image error quantity, $I_e$, of less than about 15% when viewed from the perspective of the observer is positioned within the field of view of the reflective surface M, and $I_e$ is calculated according to the following equation:

$$I_e = \frac{1}{\text{diameter}(T(A))} \left( \int_A \|T(1, y, z) - T_M(1, y, z)\|^2 \, dy \, dz \right)^{\frac{1}{2}}$$

wherein A is the image of a domain in the image plane over which the reflective surface M is a graph T is a transformation from the image plane to the object plane of a non-reversed, undistorted direct reflection of an object or object plan and $T_M$ is a non-reversing image transformation induced from the image plane to the object surface by reflecting at least one ray off reflective surface M; and
  wherein the reflective surface M is convex or saddle-shaped.

2. The non-reversing mirror of claim 1, wherein the reflective surface M has an image error quantity $I_e$ of less than about 10%.

3. The non-reversing mirror of claim 1, wherein the reflective surface M has an image error quantity $I_e$ of less than about 5%.

4. The non-reversing mirror of claim 1, wherein the reflective surface M has an image error quantity $I_e$ of less than about 3%.

5. The non-reversing mirror of claim 1, wherein said reflective surface M is capable of reflecting at least a 30° field of view when viewed from the perspective of an observer.

6. The non-reversing mirror of claim 1, wherein said reflective surface M is capable of reflecting at least a 40° field of view when viewed from a perspective of an observer.

7. The non-reversing mirror of claim 1, wherein said reflective surface M is capable of reflecting at least a 45° field of view when viewed from a perspective of an observer.

8. The non-reversing mirror of claim 1, wherein said reflective surface M is saddle shaped.

9. The non-reversing mirror of claim 1, wherein said reflective surface M has a magnification of about unit magnification or less.

10. A method for producing a non-reversing mirror comprising generating a non-reversed perspective view reflective surface M comprising the steps of:
  a) inputting data comprising an image surface, a domain of an image surface, an object surface, a non-reversing undistorted direct correspondence T and coordinates of an eye of an observer;
  b) computing a vector field W(x,y,z) as an algebraic expression from the following three equations;

$$\text{proj}(x,y,z) = (1, y/x, z/x)$$

$$T(\text{proj}(x,y,z)) = (x_0, -\alpha y/x, \beta z/x)$$

wherein k is the distance between the reflective surface and observer, s' is the distance from the reflective surface M to the object plane, $x_0 = -(s'-k)$, and $\alpha$ and $\beta$ are magnification factors, $$W(x, y, z) = \frac{T(\text{proj}(x, y, z)) - (x, y, z)}{\|T(\text{proj}(x, y, z)) - (x, y, z)\|} + \frac{\text{proj}(x, y, z) - (x, y, z)}{\|\text{proj}(x, y, z) - (x, y, z)\|};$$

d) representing $f$ as a combination of basis functions of said reflective surface M with unknown coefficients;
  e) solving for said unknown coefficients by minimizing an integral of the following equation, over the volume V of the cross-product of vector field W(x,y,z) and a gradient vector field $\nabla f$:

$$\text{Cost}(f) = \int\int\int_V \|\nabla f \times (W/\|W\|)\|^2 dx\,dy\,dz = f^*(x, y, z),$$

wherein $\nabla f$ is the gradient of the function represented by select basis functions; and f) calculating a resulting minimizer $f^*$ that represents the reflective surface M as a solutions to an equation $f^*(x,y,z)=C$, where $C=f^*(a,b,c)$ for a chosen point $(a,b,c)$ in V wherein minimizer $f^*$ is represented by the polynomial function $f(x,y,z)$:

$$f(x, y, z) = \sum_{i+j+k \le N} a(i, j, k) x^i y^j z^k$$

where N is a fixed positive integer, there are at least three variable coefficients $\alpha(i,j,k)$ and $\alpha_{1,0,0}=1$; and g) producing a non-reversing mirror using the calculated minimizer $f^*$.

11. The method of claim 10, wherein the reflective surface M reflects a field of view of at least 30° when viewed from a perspective of an observer.

12. The method of claim 10, wherein the reflective surface M reflects a field of view of at least 40° when viewed from a perspective of an observer.

13. The method of claim 10, wherein the reflective surface M reflects a field of view of at least 45° when viewed from a perspective of an observer.

14. The method of claim 10, wherein the reflective surface M is saddle shaped.

15. The method of claim 10, wherein the reflective surface M has an image error quantity, $I_e$, of less than about 15%, wherein $I_e$ is calculated according to the following equation:

$$I_e = \frac{1}{\text{diameter}(T(A))} \left( \int_A \|T(1, y, z) - T_M(1, y, z)\|^2 \, dy\,dz \right)^{\frac{1}{2}}$$

wherein A is the image of a domain in the image plane over which the reflective surface M is a graph and $T_M$ is the non-reversing reflection transformation induced from the image plane to the object surface by reflective surface M.

16. The method of claim 10, wherein the reflective surface M has an image error quantity $I_e$ of less than about 10%, and $I_e$ is calculated according to the following equation:

$$I_e = \frac{1}{\text{diameter}(T(A))} \left( \int_A \|T(1, y, z) - T_M(1, y, z)\|^2 \, dy\,dz \right)^{1/2}$$

wherein A is the image of a domain in the image plane over which the reflective surface M is a graph T is a transformation from the image plane to the object plane of a non-reversed, undistorted direct reflection of an object or object plane and $T_M$ is a non-reversing image transformation induced from the image plane to the object surface by reflecting at least one ray off reflective surface M.

17. The method of claim 16, wherein the reflective surface M has an image error quantity $I_e$ of less than about 5%.

18. The method of claim 10, wherein said magnification factors $\alpha$ and $\beta$ are about k+s' or less.

* * * * *